(12) United States Patent
Liu et al.

(10) Patent No.: US 6,804,574 B2
(45) Date of Patent: Oct. 12, 2004

(54) METHOD OF USING A COMPUTER WITH A LASER DRILLING SYSTEM

(75) Inventors: Xinbing Liu, Acton, MA (US); Chen-Hsiung Cheng, Chelmsford, MA (US); John Cronin, Milton, VT (US); Nancy Edwards, Essex Junction, VT (US); Christopher Rose, Essex Junction, VT (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/267,007

(22) Filed: Oct. 8, 2002

(65) Prior Publication Data
US 2004/0019403 A1 Jan. 29, 2004

Related U.S. Application Data
(60) Provisional application No. 60/398,652, filed on Jul. 25, 2002.

(51) Int. Cl.[7] ............................................. G06F 19/00
(52) U.S. Cl. ....................................... 700/166; 700/180
(58) Field of Search ........................ 219/121.6, 121.61, 219/121.62; 700/180, 166, 173

(56) References Cited

U.S. PATENT DOCUMENTS

| | | | | |
|---|---|---|---|---|
| 5,575,935 A | * | 11/1996 | Nakata | 219/121.61 |
| 5,841,096 A | * | 11/1998 | Takahashi et al. | 219/121.62 |
| 5,856,649 A | * | 1/1999 | Yamazaki et al. | 219/121.67 |
| 6,345,205 B1 | * | 2/2002 | Inamasu et al. | 700/47 |
| 6,627,844 B2 | * | 9/2003 | Liu et al. | 219/121.71 |
| 6,749,285 B2 | * | 6/2004 | Liu et al. | 347/47 |

* cited by examiner

*Primary Examiner*—Leo Picard
*Assistant Examiner*—Ryan Jarrett
(74) *Attorney, Agent, or Firm*—Harness, Dickey & Pierce, PLC

(57) ABSTRACT

A method of determining compatibility of user input parameters for use with a laser drilling system includes providing compatibility data characteristic of a plurality of laser drilling operations, receiving input parameters characteristic of a desired laser drilling operation, and comparing the input parameters to the compatibility data, thereby determining whether the input parameters are incompatible.

35 Claims, 8 Drawing Sheets

| LASER PARAMETER ID | LASER NAME | WAVE LENGTH | PULSE ENERGY | PULSE WIDTH | SPOT SIZE | REPETITION RATE |
|---|---|---|---|---|---|---|
| 1 | PICO1 | 1053nm | 1mJ | 20ps | 10um | 1kHz |
| 2 | EXCI1 | 248nm | 100mJ | 20ns | 10um | 100kHz |
| 3 | PICO2 | 1064nm | 10mJ | 40ps | 10um | 2kHz |
| NEW PROFILE | ... | | ... | ... | ... | |

| WORKPIECE MATER. ID | WORK PIECE NAME | MATER. NAME | THICK-NESS | TEMPER | HARD-NESS | REFLECTIVITY FACTOR |
|---|---|---|---|---|---|---|
| 1 | INKJET NOZZLE FOIL 1 | S. STEEL 304 | 50um | ANNEALED | Xx | 50% |
| 2 | CIRCUIT BOARD 1 | KAPTON | 100um | Xx | Xx | 30% |
| 3 | INKJET NOZZLE FOIL 2 | MOLYB-DENUM | 100um | Xx | Xx | 60% |
| NEW PROFILE | ... | | ... | | ... | ... |

| WORKPIECE GEOMETRY ID | WP GEOMETRY NAME | DEPTH | ENTRY DIAMETER | EXIT DIAMETER |
|---|---|---|---|---|
| 1 | CONE 1 | 50 | 80 | 20 |
| 2 | CYLINDER 1 | 50 | 50 | 50 |
| 3 | CONE 2 | 50 | 75 | 25 |
| NEW PROFILE | ... | ... | ... | ... |

FIG. 5B

| COMBINATION ID | WP GEOMETRY ID | LASER BEAM ID | WP MATERIAL ID | COMPATIBLE |
|---|---|---|---|---|
| 1 | 1 | 1 | 1 | YES |
| 2 | 1 | 2 | 1 | YES |
| 3 | 1 | 2 | 2 | NO |
| ... | | | | |

FIG. 5C

| DRILLING POINT ID | X COORDINATE | Y COORDINATE | Z COORDINATE |
|---|---|---|---|
| 1 | 1 | 1 | 0 |
| 2 | 1 | 2 | 1 |
| 3 | 1 | 1 | 2 |

FIG. 5D

METHOD OF USING A COMPUTER WITH A LASER DRILLING SYSTEM

CROSS-REFERENCE TO RELATED APPLICATIONS

This application claims the benefit of U.S. Provisional Application No. 60/398,652, filed on Jul. 25, 2002. The disclosure of the above application is incorporated herein by reference.

FIELD OF THE INVENTION

The present invention generally relates to laser drilling and laser milling and particularly relates to computer automated control methods for use with a laser drilling system.

BACKGROUND OF THE INVENTION

Material ablation by pulsed light sources has been studied since the invention of the laser. Reports in 1982 of polymers having been etched by ultraviolet (UV) excimer laser radiation stimulated widespread investigations of the process for micromachining. Since then, scientific and industrial research in this field has proliferated—mostly spurred by the remarkably small features that can be drilled, milled, and replicated through the use of lasers.

Ultrafast lasers generate intense laser pulses with durations from roughly $10^{-11}$ seconds (10 picoseconds) to $10^{-14}$ seconds (10 femtoseconds). Short pulse lasers generate intense laser pulses with durations from roughly $10^{-10}$ seconds (100 picoseconds) to $10^{-11}$ seconds (10 picoseconds). A wide variety of potential applications for ultrafast and short pulse lasers in medicine, chemistry, and communications are being developed and implemented. These lasers are also a useful tool for milling or drilling holes in a wide range of materials. Hole sizes as small as a few microns, even sub-microns, can readily be drilled. High aspect ratio holes can be drilled in hard materials, such as cooling channels in turbine blades, nozzles in ink-jet printers, or via holes in printed circuit boards.

Advanced laser drilling systems contain elements that maneuver the laser beam(s) and/or the workpiece(s) in a pattern such that the laser beam ablates the workpiece according to pre-determined geometry requirements. Computers can be programmed to rapidly perform the calculations required to guide precision drilling of a variety of shapes. Once these calculations are made for a given geometry, they can be executed in a repeatable manner for many workpieces. The coordinates calculated by laser milling algorithms are subsequently communicated to the elements of the laser drilling system to create the pre-determined geometry in the workpiece. Manually selecting laser drilling system parameters and making changes to those settings can be complex, and laser physicists are usually directly responsible for these activities.

Among the challenges in computer automation of laser drilling system is the problem of how to provide a more marketable laser drilling system. Current laser drilling systems do not have an intuitive approach to select workpiece geometry, laser type, or workpiece material as required in a manufacturing environment. Having a way to streamline changes to parameter input would increase the appeal, utility, and sales of laser drilling systems. What is needed is a way to provide a more marketable laser drilling system.

Also among the challenges in computer automation of laser drilling system is the problem of how to decrease the operating costs of a laser drilling system. Laser drilling systems utilize many complex elements and concepts to perform a specific task. Highly skilled laser physicists are often required to operate the laser drilling system because they understand the technical details of operating the laser drilling system, its elements, and the necessary input parameters. Employing high-salaried laser physicists that understand the technical details of the laser drilling system adds considerably to the operating costs of the laser drilling system. What is needed is a way to decrease the operating costs of a laser drilling system.

Further among the challenges in computer automation of laser drilling system is the problem of how to facilitate the reconfiguration of a laser drilling system to mass manufacture a variety of laser-drilled products. Laser drilling systems can be used to create any number of complex shapes in a workpiece. In a mass-manufacturing environment, changes to the laser type, workpiece geometry, and workpiece materials are necessary to produce varied shapes and such changes must be made quickly. What is needed is a way to facilitate the reconfiguration of a laser drilling system to mass manufacture a variety of laser-drilled products.

Still further among the challenges in computer automation of laser drilling system is the problem of how to prevent repetition of previously failed laser drilling system parameter combinations in future drilling runs. In laser drilling systems, certain combinations of laser type, workpiece geometry, and workpiece materials cannot be used to meet product specifications. For example, excimer lasers are not conducive to drilling high quality holes in metal foils because the long-duration (nanoseconds) excimer pulses cause significant melting in metal foils that leads to poor hole quality. Each attempt with a new combination of inputs is expensive; therefore, the number of failed attempts must be kept to a minimum to reduce operating costs. What is needed is a way to prevent repetition of previously failed laser drilling system parameter combinations in future drilling runs.

SUMMARY OF THE INVENTION

In accordance with one aspect of present invention, the method determines compatibility of user input parameters for use with a laser drilling system, based on previously determined compatibility data. The method begins with the input of at least one first parameter associated with laser beam characteristics into a computer system, at least one second parameter associated with workpiece material characteristics into said computer system, and at least one third parameter associated with workpiece geometry characteristics into said computer system. The computer system processes these first, second and third parameters to calculate a tool path. A laser drilling data set that includes said tool path is then generated and exported to the laser drilling system.

There exist several differences between the present invention and previous technology. A first difference between the present invention and the previous technology is that the present invention allows for changes within the same system, whereas the previous technology does not provide an adjustable laser drilling system. A second difference between the present invention and the previous technology is that the present invention provides a user-friendly interface to configure a laser drilling system, whereas the previous technology does not. A third difference between the present invention and the previous technology is that the present invention includes an implementation of the combination of laser milling correction and milling algorithms with a computer, whereas the previous technology does not.

A fourth difference between the present invention and the previous technology is that the present invention provides a way to improve laser drilling system performance by "learning" from failed attempts and incorporating feedback into the system operation, whereas the previous technology does not. A fifth difference between the present invention and the previous technology is that the present invention provides intelligent screening procedures to interactively detect and abort another attempt of using previously known failure factors, whereas the previous technology does not.

The present invention has several advantages over the previous technology. A first advantage of the present invention is that it provides a more marketable laser drilling system. A second advantage of the present invention is that it provides a way to decrease the operating costs of a laser drilling system. A third advantage of the present invention is that it provides a way to facilitate the reconfiguration of a laser drilling system to mass manufacture a variety of laser-drilled products. A fourth advantage of the present invention is that it provides a way to prevent repetition of previously failed laser drilling system parameter combinations in future drilling runs. A fifth advantage of the present invention is that it allows for expandability of parameters and a nearly infinite number of combinations of workpiece materials, workpiece geometry, and laser characteristics. A sixth advantage of the present invention is that it provides faster re-configuration of a laser drilling system when changes are made.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5B is an example of a workpiece geometry data table according to the present invention;

FIG. 5C is an example of a combination of parameters table according to the present invention;

FIG. 5D is an example of a drilling data table according to the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
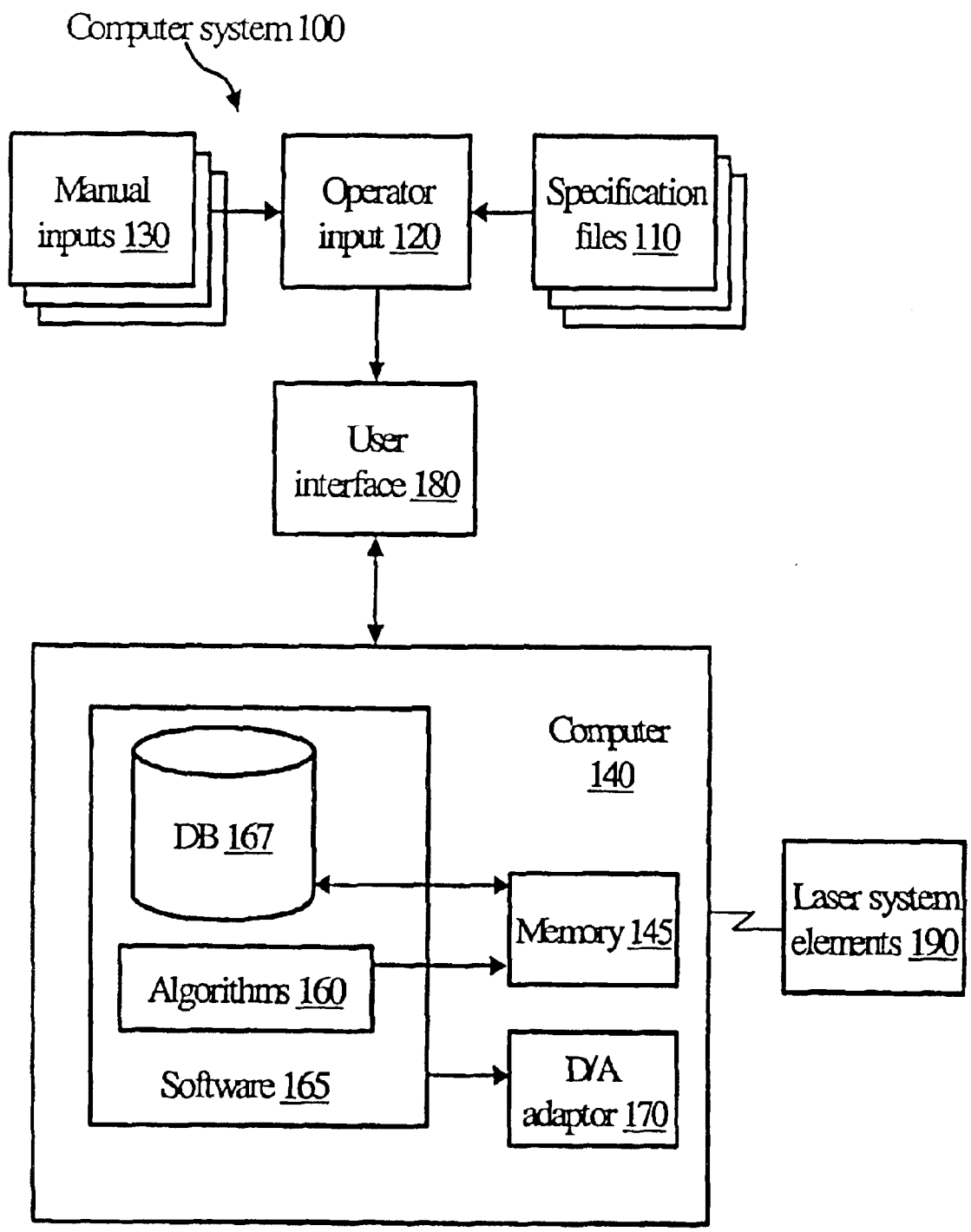
FIG. 1 is a schematic block diagram of a computer system for controlling a laser drilling system according to the present invention.

FIG. 1 shows an exemplary computer system 100 to control a laser drilling system. The present invention is not limited to working with the combination of elements as shown in computer system 100. A computer system with additional or different elements may be used to execute the present invention.

Computer system 100 includes a means for operator input 120 through a user interface 180, one or more specification files 110, or manual inputs 130; a computer 140 with a memory 145, a digital-to-analog (D/A) adaptor 170, and software 165 that contains one or more algorithms 160 and a database (DB) 167; and laser system elements 190.

Operator input 120 consists of specific instructions from the laser drilling system operator regarding the geometry of the workpiece, the characteristics of the laser, and the physical characteristics of the workpiece. Input regarding the workpiece geometry, the laser, and the physical characteristics of the workpiece is achieved by importing specification files 110 (e.g. database table or CAD file) or, alternatively, with manual inputs 130.

Within computer 140, memory 145 is random access memory. In one example, computer 140 has sufficient cache (not shown) and memory 145 to hold and send laser drilling data sets to laser system elements 190 without creating a separate file. In an alternate example, laser drilling data sets are stored in a file (not shown) within computer 140 and sent to laser system elements 190 when ready for transmission. Computer 140 has at least 200 MHz Pentium II processor with 64 MB RAM.

Software 165 manages the operation of computer 140 for use in a laser drilling system. Software 165 controls: gathering inputs and running algorithms 160 prior to milling, accessing data from DB 167, sending data to D/A adaptor 170, and populating user interface 180. Software 165 may be written with any of a variety of programming languages, such as C/C++, Java, FORTRAN, or COBOL.

Algorithms 160 consist of milling (material ablation) and correction algorithms to be used in controlling and defining the movements of laser system elements 190 required to achieve desired workpiece geometry, including the laser beam parameters, workpiece material characteristics, and variable inputs of workpiece geometry. Parameter inputs are fed into algorithms 160, which are run by software 165. Algorithms 160 define the milling points on the X- and Y-axes, as well as the amount of time (T) to drill each milling point. In a specific example, the workpiece (not shown) is milled using a constant tool path algorithm that can be used to direct the movement of a piezo electric transducer (PZT) scan mirror in a laser drilling system to produce tapered holes in a consistent, repeatable process. In another example, correction algorithms are also used to compensate for hysteresis and reflection geometry issues in using a PZT scan mirror to direct a laser upon a workpiece.

DB 167 is a database management system containing ordered and structured data to be used by software 165 to control a laser drilling system. Inputs from user interface 180 and data sets generated by algorithms 160 are stored in DB 167 for future use. DB 167 stores profiles of pre-defined workpiece geometries, laser beam parameters, and workpiece material parameters in the form of data tables as illustrated below. DB 167 also contains a buffer (not shown) for the storage of data that drives laser system elements. Data storage and recall within DB 167 is completed with conventional database management system processes and rules, such as those available from Oracle Corporation.

D/A adaptor 170 is a digital-to-analog adaptor that converts digital information resulting from algorithms 160 into voltages that are sent to laser system elements 190. If laser system elements 190 have their own digital-to-analog adaptor function, D/A adaptor 170 is removed from computer 140. In this case, laser system elements 190 accept the digital information directly from computer 140.

User interface 180 provides a way for a system operator to efficiently use computer 140. User interface 180 is displayed on a monitor (not shown) attached to computer 140, and displays prompts to direct the operator to select a workpiece geometry. In one example, user interface 180 is a graphical user interface (GUI) that includes menu-driven screens providing a way to select the workpiece geometry parameters, laser beam parameters, and workpiece material parameters, or, alternatively, define new parameters, and begin the laser drilling process.

Laser system elements 190 are elements within a laser drilling system (not shown) that control the drilling process. Examples of elements included in laser system elements 190 include galvanometers, PZT scan mirrors, and moveable workpiece stages.

In operation, computer system 100's task is to control a laser drilling system. When a laser system operator provides operator input 120, software 165 starts user interface 180, and user interface 180 prompts the operator to select and/or enter new input parameters to be stored in DB 167. Milling information and algorithms 160 that are specific to the combination of input parameters are sent to memory 145 from DB 167. Software 165 calls on and executes algorithms 160. Algorithms 160 then generate a drilling data set that defines every milling point upon workpiece, the corresponding voltages required to direct laser system elements 190, and the sequence in which the points are to be drilled. Data specific to each point to be milled by the laser drilling system, the voltages, and the sequence are sent by software 165 to D/A adaptor 170. D/A adaptor 170 converts data to analog voltages required to maneuver laser system elements 190. Laser system elements 190 drill the specified geometry in specified workpiece.

Use of computer system 100 greatly streamlines and simplifies the operation of a laser drilling system.

In accordance with the present invention a method of using a computer system (e.g. computer system 100) to control a laser drilling system provides a way to reduce the costs of operating and configuring a laser drilling system in a mass-manufacturing environment by allowing a layperson to operate and change drilling system parameters. The disclosed method further allows for capture and storage of performance feedback, preventing repetition of previously failed laser drilling system parameter combinations.

Figure 2:
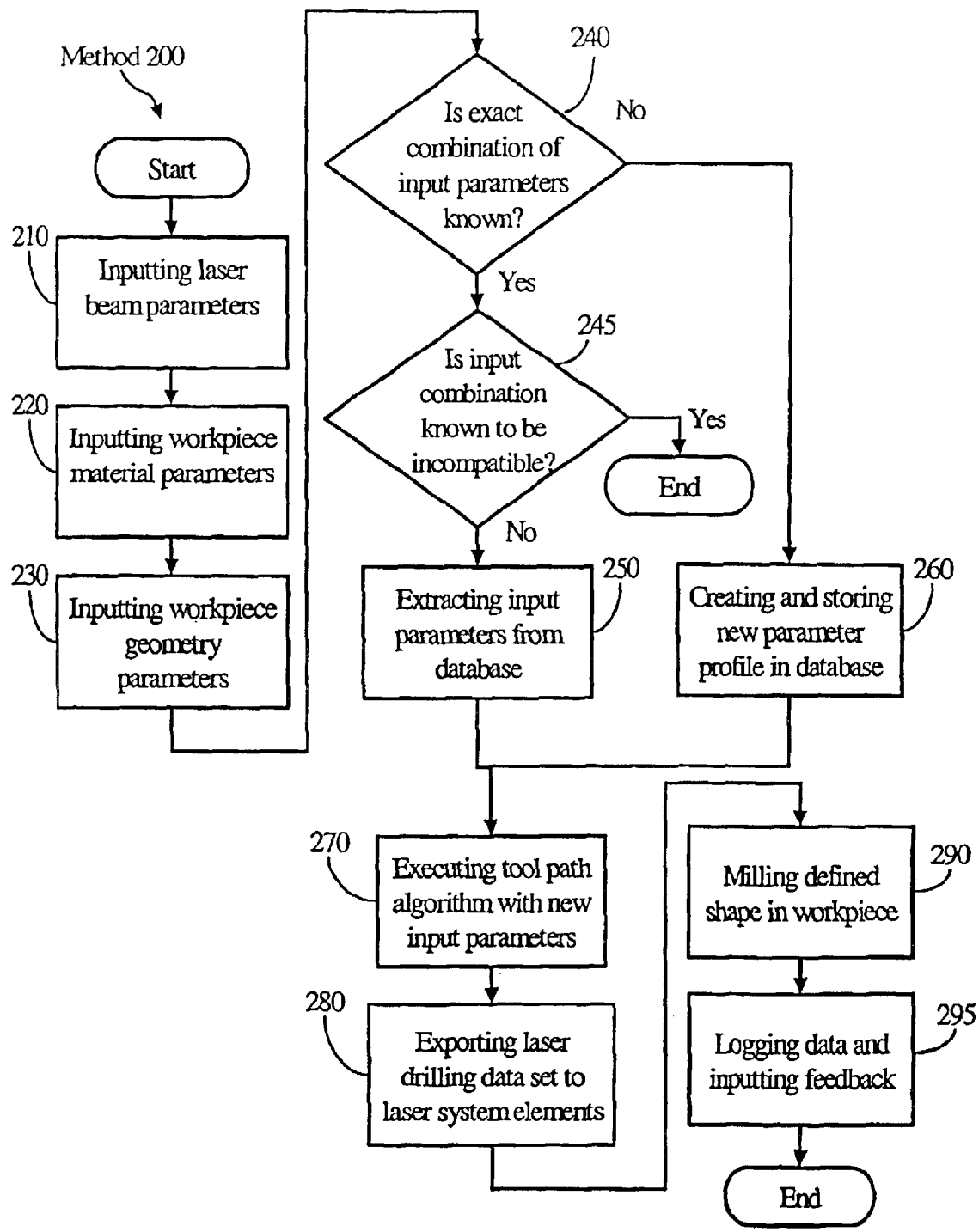
FIG. 2 is a flow chart diagram depicting a method of using a computer system to control a laser drilling system according to the present invention.

FIG. 2 shows a method 200 of using computer system to control a laser drilling system. Throughout method 200 and all submethods, computer system 100 is used as an example, although the present invention is not limited to the specific elements and arrangement of computer system 100. Method 200 includes several steps.

Step 210: Inputting laser beam parameters. In this step, the system operator inputs the specific laser beam parameters (e.g. laser pulse energy, pulse width, and spot size) of the laser drilling system. The laser beam parameters must be specified because laser beam parameters such as laser wavelength, laser pulse energy, pulse width, repetition rate and spot size in a specific laser drilling system impact the ability to drill certain materials and achieve the desired workpiece geometry specifications. A laser beam with given characteristics will interact with different workpiece materials in different ways that impact the quality of drilling results. The system operator selects a pre-defined laser beam parameters profile that has been stored in a database, or alternatively creates a new laser beam profile and stores the profile within a computer for future use. A "profile" is defined as a grouping of parameters related to a required input for laser drilling, and is referred to throughout this disclosure as such (e.g. workpiece geometry profile, laser beam profile, workpiece material profile). The process of inputting laser beam parameters is detailed in Method 300 in FIG. 3A, wherein a method 300 of inputting laser beam parameters into a computer system includes several steps.

Step 310: Are laser beam parameters established? In this decision step, the system operator determines if the laser beam parameters have already been defined as a profile and saved. In one example, the laser beam parameter profiles are displayed to the system operator via user interface 180, which retrieves profile data stored in DB 167 within computer 140. If the laser beam parameters have been defined, method 300 proceeds to step 330, if the laser beam parameters have not been defined, method 300 proceeds to step 320.

Figures 3A, 3B:
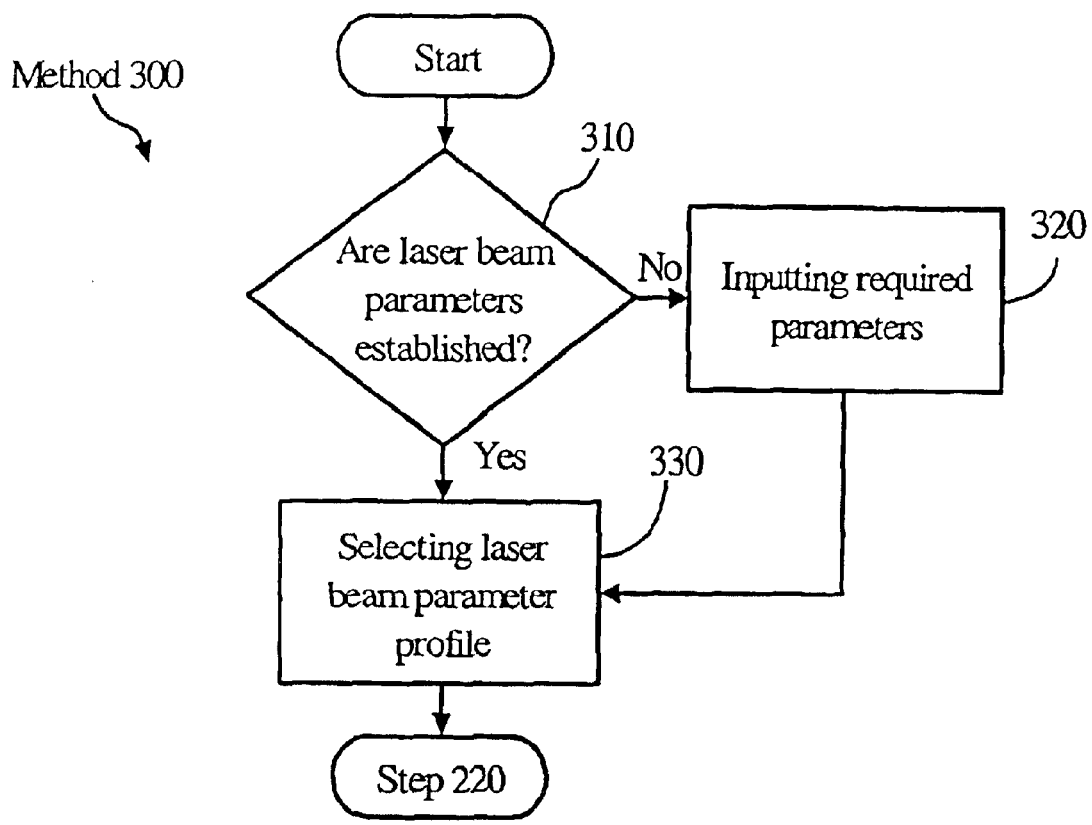
FIG. 3A is a flow chart diagram depicting a method of inputting laser beam parameters into a computer system for use in a laser drilling system according to the present invention.
FIG. 3B is an example of a laser parameters data table according to the present invention.

Table 1 of FIG. 3B shows an example of a table structure and exemplary data contained in DB 167 to define laser parameter profiles. Each row in Table 1 represents a specific laser parameter profile and contains the critical laser measurements within a laser drilling system.

In one example, software 165 selects the stored laser parameter profiles from DB 167, and user interface 180 displays the stored laser parameter profiles to the system operator. Once the system operator reviews the stored laser parameter profiles, if the desired laser parameter profile is displayed in user interface 180, method 300 proceeds to step 330, if the laser parameter profile is not displayed (and therefore has not been defined) and method 300 proceeds to step 320.

Step 320: Inputting required laser parameters. In this step, the system operator inputs laser beam parameters. In one example, the system operator inputs laser beam parameters via user interface 180 by importing specification file 110 (e.g. a database table) containing the required parameters, or alternatively via manual input 130 (e.g. keyboard input, parameter by parameter). A set of laser beam parameters is stored as a profile in DB 167, within computer 140. Examples of laser beam parameters include but are not limited to laser wavelength, laser pulse energy, pulse width, repetition rate and spot size. In one example, values of trivial parameters such as laser pulse energy and repetition rate are not saved in DB 167. Profiles that differ only in "trivial fields" are considered identical. "Trivial parameters" are used in speed scaling in the tool path calculation and do not impact the drilling capability of the system. Discarding "trivial parameters" as described in this example enhances the manageability of DB 167 and offers ease of use.

Step 330: Selecting laser beam parameter profile. In this step, the system operator selects a laser beam profile from the list of established profiles stored in a database. In one example, user interface 180 displays the profiles stored in DB 167, within computer 140. Then the system operator selects the desired laser beam profile via user interface 180. Trivial parameters such as laser pulse energy and repetition rate also can be modified at this step. The data from the selected profile is held in memory for use in the algorithms used in step 240. Method 300 ends by returning to step 220 in method 200.

Step 220: Inputting workpiece material parameters. In this step, the system operator inputs the workpiece material characteristics. It is important to consider the physical characteristics of the workpiece with regard to ablation and laser drilling system performance. For example, it may be important to consider that a stainless steel foil workpiece reflects much of a specific type of laser's energy. User interface 180 displays all the stored material profiles from DB 167 and highlights those that are known to be compatible to the laser parameter profile selected in step 210. The system operator selects an existing workpiece material, profile that has already been defined and stored in a computer or other file storage media, or alternatively creates a new workpiece material profile and stores the profile for future use. The process of inputting workpiece material characteristics is detailed in method 400 in FIG. 4A, wherein a method 400 of inputting workpiece material characteristics for use in a laser drilling system includes several steps.

Step 405: Displaying known workpiece materials. In this step, a database operation searches the database to determine the list of material parameter profiles stored in DB 167. In one example, workpiece materials compatible with the laser parameter profiles selected in step 210 are highlighted by software 165 in user interface 180 to ease selection by the system operator. In this example, the pre-defined workpiece material profiles, including known incompatible profiles, are displayed to the system operator via user interface 180, which retrieves profile data stored in DB 167 within computer 140. This step eases the process of selecting a proper material profile because the highlighted profiles are only a subset of all the material profiles stored in DB 167. This step also helps to avoid the system operator accidentally inputting a known incompatible material. In another example, the system operator selects an incompatible material profile for testing purposes.

Figures 4A, 4B:
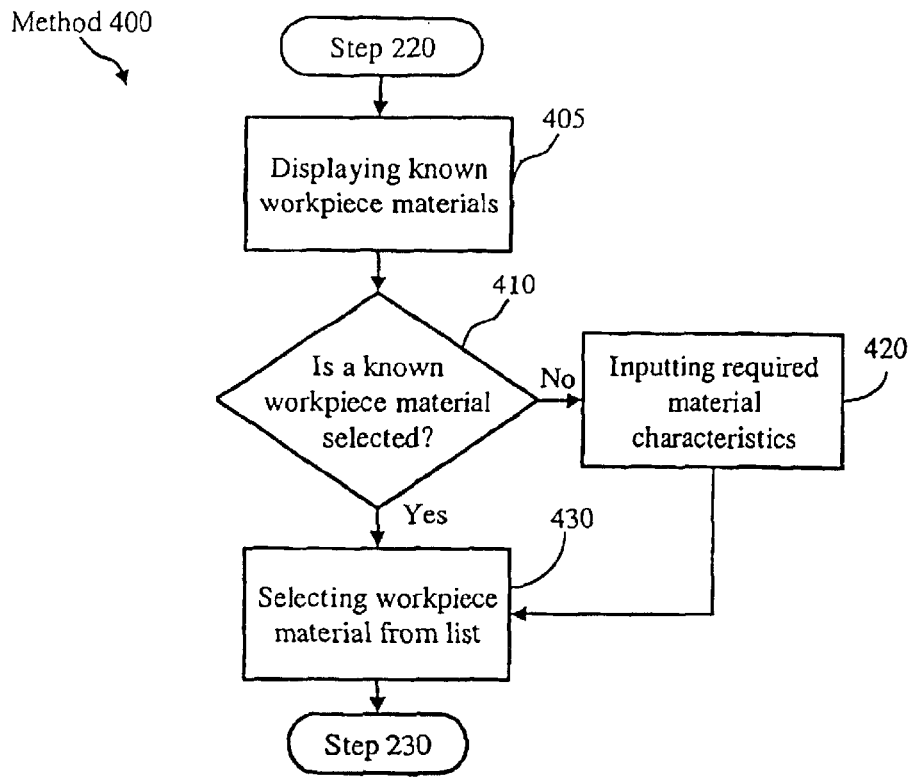
FIG. 4A is a flow chart diagram depicting a method of inputting workpiece material characteristics for use in a laser drilling system according to the present invention.
FIG. 4B is an example of a workpiece material data table according to the present invention.

Step 410: Is a known workpiece material selected? In this decision step, the system operator determines if the workpiece material characteristics have already been defined as a profile and saved. In one example, the system operator selects a workpiece material profile known to be compatible with the laser parameter profiles defined in step 210. In another example, the system operator selects a new workpiece material profile that does not have a workpiece material profile stored in DB 167. If a known workpiece material characteristics is selected, method 400 proceeds to step 430, if the workpiece material characteristics have not been defined, method 400 proceeds to step 420. Table 2 of FIG. 4B shows an example of a table structure and exemplary data stored to define laser parameter profiles. Each row in Table 2 represents a specific workpiece material profile to be drilled with a laser drilling system, and contains the critical measurements of the workpiece for each of the workpiece geometries in the table. In this example, software 165 selects a stored workpiece material profile from DB 167, and user interface 180 displays the stored workpiece material profiles to the system operator. Once the system operator reviews the stored workpiece material profiles, if the stored workpiece material profile is displayed in user interface 180, method 400 proceeds to step 430, if the workpiece material profile is not displayed (and therefore has not been defined), the system operator can enter a new material profile and method 400 proceeds to step 420.

Step 420: Inputting required material characteristics. In this step, the system operator inputs workpiece material characteristics. In one example, the system operator inputs workpiece material characteristics via user interface 180 by importing specification file 110, or alternatively via manual input 130. A set of material characteristics is stored as a profile in DB 167 within computer 140.

Step 430: Selecting workpiece material characteristics from list. In this step, the system operator selects workpiece material characteristics from a list of established workpiece materials from a database. In one example, user interface 180 displays the profiles stored in DB 167, within computer 140. Then the system operator selects the desired workpiece material profile via user interface 180. In another example, the system operator chooses an un-highlighted, incompatible material profile via user interface 180 for further experimentation and user interface 180 displays a warning message before accepting the incompatible material profile. The data from the selected profile is held in memory for use in the algorithms used in step 240. Method 400 ends by returning to step 230 in method 200.

Figure 5A:
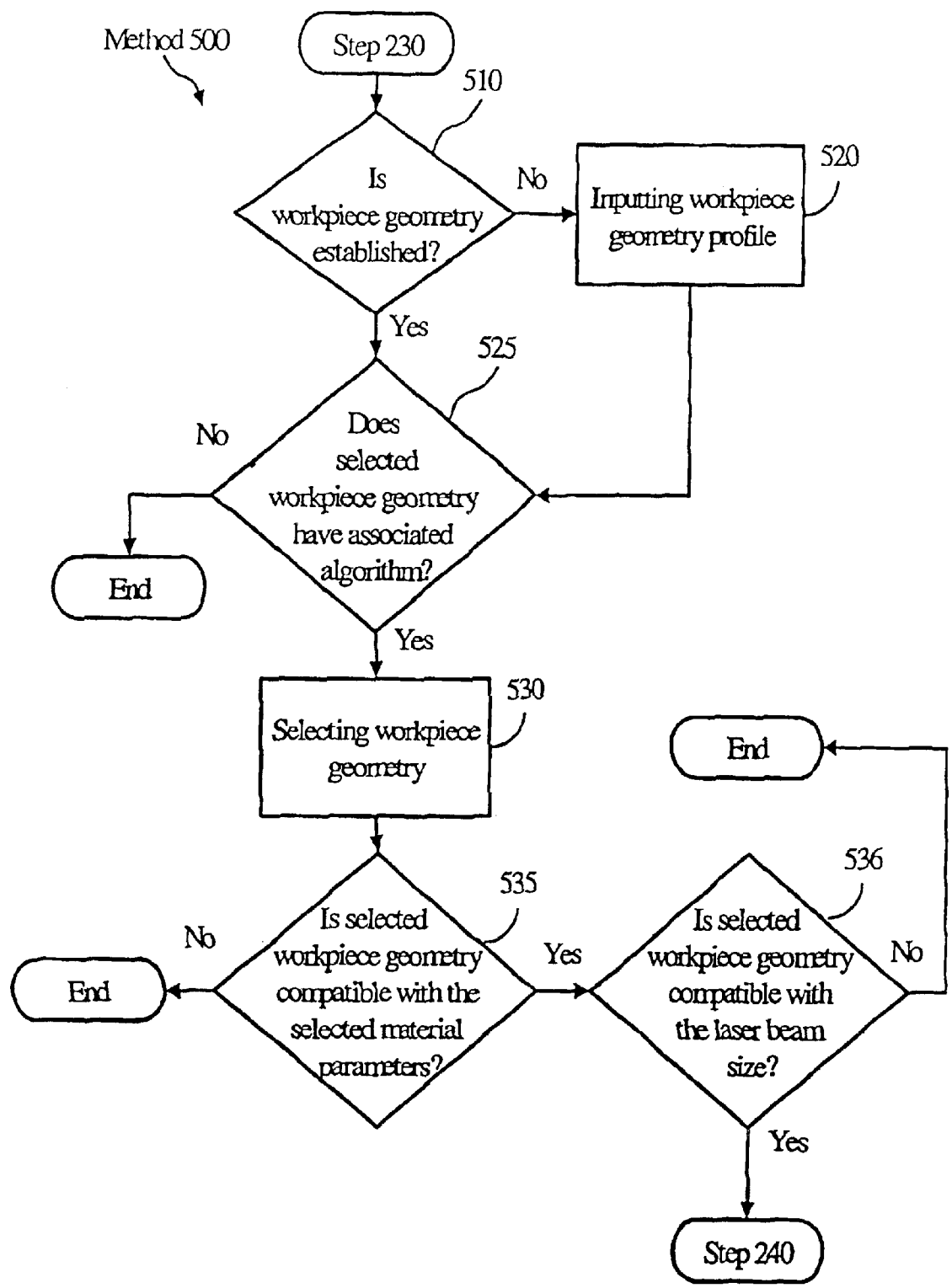
FIG. 5A is a flow chart diagram depicting a method of inputting workpiece geometry into a computer system for use in a laser drilling system according to the present invention.

Step 230: Inputting workpiece geometry parameters. In this step, the system operator inputs the workpiece geometry parameters. The required workpiece geometry represents the desired shape of the finished product, and provides the information needed to define the tool path in step 240. The system operator selects either an existing workpiece geometry profile that has been defined and stored in a computer or other file storage media, or creates a new workpiece geometry profile and stores the profile for future use. Pre-defined workpiece geometry profiles are associated with a specific milling (and if necessary, correction) algorithm, and this information is stored within a computer or other file storage media. The process of inputting workpiece geometry parameters is detailed in method 500 in FIG. 5A, wherein a method 500 of inputting workpiece geometry into a computer system includes several steps.

Step 510: Is workpiece geometry established? In this decision step, the system operator determines if the workpiece geometry has already been defined as a profile and saved. In one example, the pre-defined workpiece geometry profiles are presented to the system operator through user interface 180, which presents profile data stored in DB 167 within computer 140. If the workpiece geometry profile has been pre-defined, method 500 proceeds to step 525; if not, method 500 proceeds to step 520.

In one example, Table 3 of FIG. 5B provides an example of workpiece geometry data stored in DB 167. The tables shown throughout this disclosure are simplified examples, to increase understanding of how method 200 is implemented, using a database such as DB 167. Table 3 shows an example of a table structure and exemplary data stored to define workpiece geometry profiles. Each row in Table 3 represents a specific workpiece geometry profile to be drilled with a laser drilling system and contains the critical measurements for each of the workpiece geometries in the table.

In this example, software 165 selects the stored workpiece geometry profiles from DB 167, and user interface 180 displays the stored workpiece geometry profiles to the system operator. The system operator reviews the stored workpiece geometry profiles. If the stored workpiece geometry profile is displayed in user interface 180, method 500 proceeds to step 525; if the workpiece geometry profile is not displayed (and therefore has not been defined), method 500 proceeds to step 520.

Step 520: Inputting workpiece geometry profile. In this step, the system operator inputs the workpiece geometry. In one example, the system operator inputs the workpiece geometry through user interface 180 by importing a specification file 110, (e.g., CAD file or database table) or, alternatively, the operator inputs workpiece geometry via manual input 130. The input, whether it is a specification file 110 or a manual input 130, must contain the minimally required data fields (e.g., Table 3).

Step 525: Does selected workpiece geometry have associated algorithm? In this step, the software determines whether an algorithm exists to execute the milling of the selected workpiece geometry. In one example, software 165 validates that an existing algorithm exists within DB 167 in computer 140. If a matching algorithm exists for the selected workpiece geometry, method 500 proceeds to step 530. If no algorithm exists within DB 167 that can execute the desired geometry, method 500 (and method 200) ends. Without an algorithm and the proper association between geometry and algorithm, milling cannot be conducted. In one example, user interface 180 queries the system operator to select from a list of existing algorithms (e.g., for a conical, cylindrical, or other shape).

Step 530: Selecting workpiece geometry. In this step, the system operator selects a workpiece geometry from the list of established geometries stored in a database. In one example, user interface 180 displays the profiles stored in DB 167 within computer 140. Then the system operator selects the desired workpiece geometry profile through user interface 180. The data from the selected profile is held in memory for use in algorithms in step 240.

Step 535: Is selected workpiece geometry compatible with the selected material parameters? In this step, the software determines whether the required geometry is compatible with the material parameters provided in step 220. In one example, software 165 compares the workpiece geometry with the material profile. If there is no compatibility issue, method 500 proceeds to step 536. If the geometry is incompatible, method 500 (and method 200) ends. In this example, if the drilling depth is deeper that the material thickness, milling cannot be conducted to achieve the desired geometry and method 500 (and method 200) ends.

Step 536: Is selected workpiece geometry compatible with the laser beam size? In this step, the software determines whether the required geometry is compatible with the laser beam size specified in step 210. In one example, software 165 compares the smallest hole diameter with the laser beam size. If the laser beam size is larger than the smallest hole diameter, method 500 (and method 200) ends. Milling cannot be conducted to achieve smaller diameter than the laser beam size. Otherwise, method 500 ends by returning to step 240 in method 200.

Steps 210, 220, and 230 facilitate the reconfiguration of a laser drilling system and allow the addition of new laser drilling profiles to enable mass manufacturing a variety of laser-drilled products.

Step 240: Is exact combination of input parameters known? In this decision step, a software program, written in any of a variety of programming languages, such as C/C++, Java, FORTRAN, or COBOL, is used to determines whether the combination of workpiece geometry, laser parameters and workpiece characteristics, as input in steps 210, 220 and 230 above has already been stored as an existing profile. In one example, software 165 in computer 140 compares the combination of inputs from steps 210, 220, and 230, against existing combinations in DB 167. If the specific combination of inputs (workpiece geometry, laser parameters, and workpiece characteristics) exists, method 200 proceeds to step 245. Otherwise, method 200 proceeds to step 260.

Step 245: Is input combination known to be incompatible? In this decision step, software 165 compares the known combination of workpiece geometry, laser parameters and workpiece characteristics input in steps 210, 220 and 230 above against known combinations that are not compatible in a laser drilling system (e.g. a laser energy that is incompatible with a specific workpiece material). This is a safeguard step to complement the incompatibility checking procedures in steps 210, 220 and 230. Previously used parameter combinations are stored in DB 167 as part of operation log. If the specific profile is known to be incompatible based on information from previous laser drilling attempts, method 200 ends. Otherwise, method 200 proceeds to step 250. An example of how laser system parameter combination information is stored in. DB 167 is shown in Table 4 of FIG. 5C.

Table 4 shows an example of a table structure and exemplary data stored to define known combinations of input parameters and feedback in a laser drilling system. In a first example illustrated using the data in Table 4, the system operator selects a combination (shown as "combination_id"=3) of workpiece geometry (shown as "wp_geometry_id"=1), laser beam (shown as "laser_beam_id"=2) and workpiece material (shown as "wp_material_id"=2). Because this combination has been previously determined to be incompatible with laser drilling system 100 (e.g., "compatible"=NO), method 200 ends. In another example, where the operator selects a combination (shown as "combination_id"=1) of workpiece geometry (shown as "wp_geometry_id"=1), laser beam (shown as "laser_beam_id"=1) and workpiece material (shown as "wp_material_id"=1) that has previously been determined to be compatible with laser drilling system 100 (e.g., "compatible"=YES or NULL), method 200 proceeds to step 250.

Step 245 prevents repetition of previously failed laser drilling system parameter combinations in future drilling runs. Before the cause of the incompatibility is understood and the understanding is incorporated into steps 210, 220 and 230 to stop the drilling procedure, this is the last screening step for possible failure.

Step 250: Extracting input parameters from database. In this step, a computer system extracts the selected input parameters from the database where they are stored. In one example, software 165 extracts the selected input parameters from database 167 associated with the profile as identified in step 240. Method 200 proceeds to step 270.

Step 260: Creating and storing new parameter profile in database. In this step, software 165 stores the new parameter profile in a database for future use. In one example, software 165 stores the new parameter profile using the workpiece geometry, laser parameters and workpiece characteristics that were input in steps 210, 220, and 230 above in DB 167.

Step 270: Executing tool path algorithm using new parameters. In this step, software combines the laser drilling parameters input by the system operator and calculates the tool path required to create the workpiece geometry. In one example, software 165 directs algorithms 160 to calculate laser drilling data set using the workpiece geometry, laser parameters and workpiece characteristics values input in steps 210, 220, and 230 above. In another example, this step is done after each combination of profiles is created (e.g., between steps 240 and 260 and the drilling data set is stored in DB 167, the profile and complete drilling data set is used again without recalculation in future laser drilling sessions.

Step 280: Exporting laser drilling data set to laser system elements. In this step, the laser drilling data set is exported to direct laser system elements to execute the desired pattern in a workpiece (not shown). In one example, a digital data set is converted to analog signal within computer 140 by D/A adaptor 170 and appropriate voltages are sent to laser system elements 190. In another example, a digital data set is sent directly to laser system elements 190 containing their own D/A adaptor. The laser drilling data set may be sent to more than one element of laser system elements 190, and the laser drilling data set is used to drill the desired workpiece geometry in the workpiece as specified in step 210. An example of an exported laser drilling data set is shown in Table 5 of FIG. 5D.

Table 5 shows an example of a table structure and exemplary laser drilling data set sent to laser system elements 190 as a result of the input of workpiece geometry, laser parameters, and workpiece material. Table 5 contains the following fields: drilling_point_id, X_coordinate, Y_coordinate, and Z_coordinate. Each row in Table 5 represents one point to be drilled with a laser drilling system. To drill the entire workpiece geometry, many points (rows from Table 5) are drilled in a workpiece. The result of executing the laser drilling data set containing the drilled points is the finished workpiece geometry.

Step 290: Milling defined shape in workpiece. In this step, laser system elements 190 implement the laser drilling data set exported in step 280 to mill the pre-defined shape in the workpiece using the laser drilling system. In one example, to create a cone-shaped hole in the workpiece, the laser drilling data set directs the tool path to remove material layer by layer, where one layer of material in the workpiece is ablated, then the shape is updated to the shape for the next layer to meet the aspect ratio of the desired workpiece geometry. In another more specific example, drilling a tapered, conical ink jet nozzle hole in a stainless steel foil using a picosecond laser, the first layer drilled is a 1 micron deep disk with 80 micron diameter, the next layer drilled is another 1 micron deep disk with the same center point but with a 78.5 micron diameter.

Step 295: Data logging and inputting feedback. In this step, the system operator assesses the final product with respect to the desired workpiece specifications, and enters feedback into a computer along with date, time and laser drilling parameters specified in step 210, 220 and 230, to be stored in a database. In one example, a system operator enters feedback via user interface 180 and feedback is stored in DB 167, within computer 140. If the combination of inputs is deemed incompatible (e.g. the specific combination of workpiece geometry X with laser parameters Y, and workpiece materials Z does not result in a product that meets specifications), this incompatibility information is stored as part of the operation log. In one example, the incompatibility is saved and referenced in step 245 during future laser drilling, preventing a laser system operator from using this combination of parameters and repeating this mistake in future laser drilling sessions. The incompatibility is investigated in depth later and the source of incompatibility is identified and incorporated into DB 167 for future use and reference in step 210, 220 and 230 to stop repetition of the failing attempt.

A nozzle plate of an ink-jet head may be constructed with the laser drilling system of the present invention as further detailed below.

Figure 6:
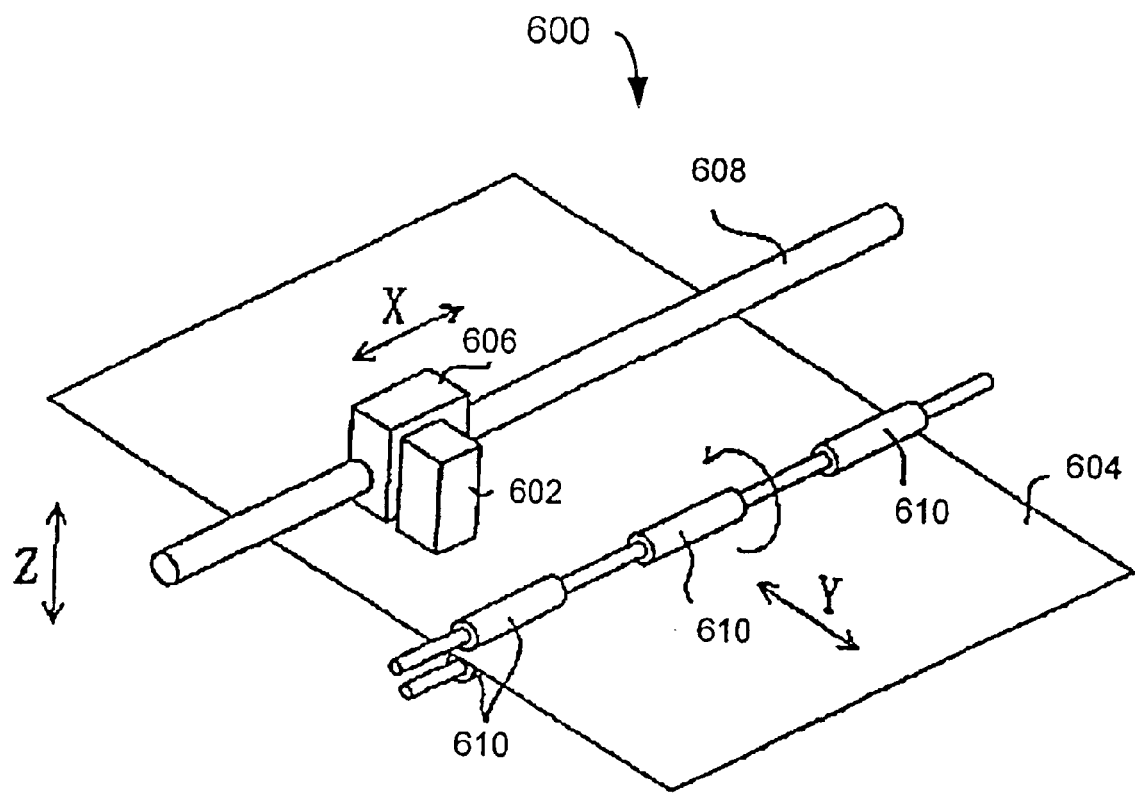
FIG. 6 is a perspective view showing major constituent components of an ink-jet printer.

As shown in FIG. 6, an ink-jet printer 600 has an ink-jet head 602 capable of recording on a recording medium 604 via a pressure generator. Ink droplets emitted from the ink-jet head 602 are deposited on the recording medium 604, such as a sheet of copy paper, so that recording can be performed on the recording medium 604.

The ink-jet head 602 is mounted on a carriage 606 capable of reciprocating movement along a carriage shaft 608. More specifically, the ink-jet head 602 is structured such that it can reciprocate in a primary scanning direction X in parallel with the carriage shaft 608.

The recording medium 604 is timely conveyed by rollers 610 in a secondary scanning direction Y.

The ink-jet head 602 and the recording medium 604 are relatively moved by the rollers 610.

Figure 7:
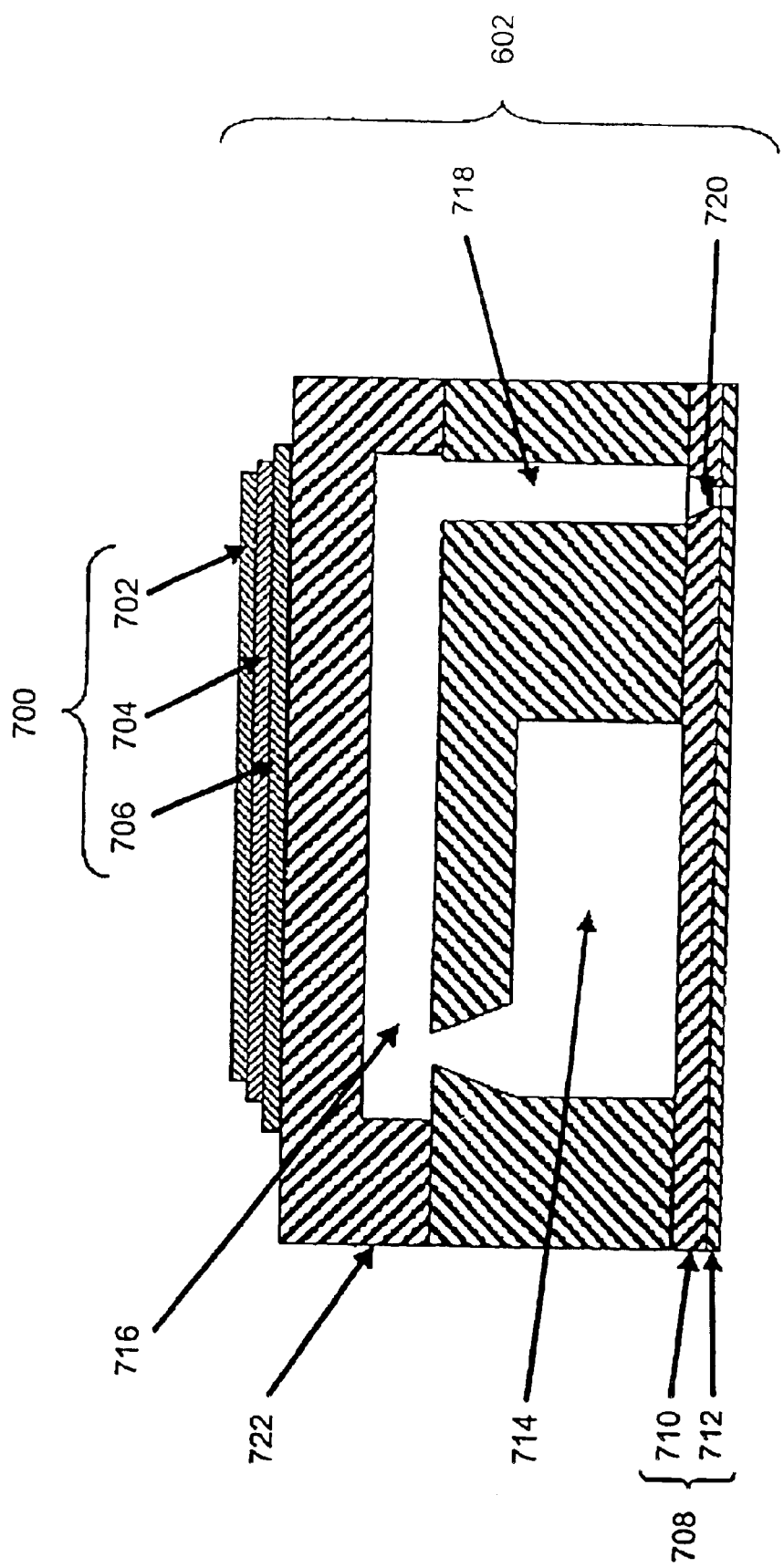
FIG. 7 is a schematic, cross-sectional view of an ink-jet head.

Referring to FIG. 7, a pressure generator 700 is preferably a piezoelectric system, a thermal system, and/or equivalent system. In this embodiment, the pressure generator 700 corresponds to a piezoelectric system which comprises an upper electrode 702, a piezoelectric element 704, and an under electrode 706.

A nozzle plate 708 comprises a nozzle substrate 710 and a water repellent layer 712. The nozzle substrate 710 is made of metal, resin, and/or equivalent material. The water repellant layer 712 is made, for example, of fluororesin or silicone resin. In this embodiment, the nozzle substrate 710 is made of stainless steel and has a thickness of 50 um, and the water repellent layer 712 is made of a fluororesin and has a thickness of 0.1 um.

The ink-jet ink is filled in an ink supplying passage 714, a pressure chamber 716, an ink passage 718, and a nozzle 720.

Ink droplets are ejected from the nozzle 720 as the pressure generator 700 pushes the pressure chamber element 720.

As a result of the present invention, very good nozzles are formed without flash and foreign matter (carbon etc) in the nozzle plate. Further, the accuracy of the nozzle outlet diameter is 20 um±1.5 um.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a laser drilling system, comprising:
    inputting at least one first parameter associated with laser beam characteristics into a computer system including steps of:
        (a) determining if said laser beam parameters have been defined as a laser beam parameter profile and saved and if so selecting the laser beam parameter profile;
        (b) if not inputting required laser beam parameters, thereby defining a laser beam parameter profile;
    inputting at least one second parameter associated with workpiece material characteristics into said computer system including steps of:
        (a) displaying known workpiece materials;
        (b) determining if said workpiece material characteristics have been defined as a workpiece material characteristics profile and saved and if not inputting required material characteristics and selecting a workpiece material having the required workpiece material characteristics, thereby defining the workpiece material characteristics profile;

(c) if so selecting said workpiece material defined by the saved workpiece material characteristics profile;

inputting at least one third parameter associated with workpiece geometry characteristics into said computer system and sufficient to define size and tapered shape of a three-dimensional hole shape to be drilled in said workpiece including steps of:

(a) determining if said workpiece geometry has been defined as a workpiece geometry profile and saved and if not inputting workpiece geometry profile;

(b) if so selecting workpiece geometry;

(c) determining if said selected workpiece geometry has an associated algorithm defining a tool path that is used to direct position of a laser beam upon a workpiece to produce the tapered hole by varying position of the laser beam to remove layers of workpiece material and by removing workpiece material layer by layer; and determining if said selected workpiece geometry is compatible with said selected material parameters and said laser beam parameter profile and if so performing the following:

(a) processing said first, second and third parameters in said computer system to calculate the tool path;

(b) determining a laser drilling data set that includes said tool path; and (c) exporting said laser drilling data set to said laser drilling system.

2. The method of claim 1 wherein said processing step includes compatibility checking of said first, second and third parameters.

3. The method of claim 1 wherein said processing step further includes inhibiting the performance of at least said exporting step if said first, second and third parameters are not compatible.

4. The method of claim 1 wherein said processing step further includes using said first, second and third parameters to access a profile parameter database.

5. The method of claim 1 wherein said processing step further includes using said first, second and third parameters to extract at least one profile parameter from a profile parameter database.

6. The method of claim 1 wherein said processing step further includes using said first, second and third parameters to generate and store at least one profile parameter in a profile parameter database.

7. The method of claim 1 further comprising using said laser drilling system to ablate a defined shape in a workpiece based on said exported data set.

8. The method of claim 1 further comprising inspecting a workpiece processed by said laser drilling system based on said exported data set and storing compatibility data for subsequent access by said computer system.

9. The method of claim 8 wherein said processing step further comprises accessing said stored compatibility data to determine the compatibility of said first, second and third parameters, and inhibiting at least said exporting step if said parameters deemed incompatible based on said previously performed inspecting step.

10. The method of claim 1 wherein said first, second and third parameters are input, at least in part, by an operator through a user interface associated with said computer system.

11. The method of claim 1 wherein said first, second and third parameters are input, at least in part, using specification files generated by a computer aided design system.

12. The method of claim 1 wherein said step of inputting said first parameter is performed by inputting at least one parameter selected from the group consisting of laser pulse energy, pulse width, spot size, wavelength, repetition rate and combinations thereof.

13. The method of claim 1 further comprising inputting and storing laser beam parameters in said predefined laser beam parameters profile using a predefined data structure that associates given laser beam parameters with a given laser drilling device.

14. The method of claim 1 wherein said step of inputting said second parameter is performed by inputting at least one material parameter selected from the group consisting of matter identity, thickness, temper, hardness, reflectivity factor and combinations thereof.

15. The method of claim 1 further comprising inputting and storing material parameters in said predefined material parameters profile using a predefined data structure that associates given material parameters with a given workpiece material identifier.

16. The method of claim 1 wherein said step of inputting said third parameter is performed by inputting at least one parameter selected from the group consisting of geometry shape, hole depth, hole entry dimension, hole exit dimension, hole coordinates and combinations thereof.

17. The method of claim 1 further comprising inputting and storing geometry parameters in said predefined geometry parameters profile using a predefined data structure that associates given geometry parameters with a given workpiece identifier.

18. A laser drilling system, comprising:

a laser system having a laser source and associated optical system elements for directing a laser beam onto a workpiece;

a computer system coupled to said laser system for controlling said laser beam to effect a predetermined material ablation operation upon said workpiece;

said computer system having a user interface for input of:

(a) at least one first parameter associated with laser beam characteristics;

(b) at least one second parameter associated with workpiece material characteristics selected from displayed known workpiece materials and inputted required material characteristics; and (c) at least one third parameter associated with workpiece geometry characteristics and sufficient to define size and shape of a tapered hole to be drilled in said workpiece;

said computer system being operable to process said first, second and third parameters and to supply a set of instructions to said laser system based on said parameters, wherein said instructions define a tool path that is used to direct position of a laser beam produced according to the laser beam parameters upon a workpiece of material indicated by the workpiece material parameters to produce the tapered hole by varying position of the laser beam to remove layers of workpiece material and by removing workpiece material layer by layer.

19. The laser drilling system of claim 18 further comprising a data store associated with said computer system for storing profile parameters used by said computer system in supplying said set of instructions to said laser system.

20. The laser drilling system of claim 19 wherein said data store is configured as a database for storing laser beam parameters in association with different laser devices.

21. The laser drilling system of claim 19 wherein said data store is configured as a database for storing material parameters in association with different workpiece materials.

22. The laser drilling system of claim 19 wherein said data store is configured as a database for storing workpiece geometry parameters in association with workpiece identifiers.

23. The laser drilling system of claim 18 wherein said computer system is configured to receive at least a portion of said first, second and third parameters from a specification file.

24. The laser drilling system of claim 23 wherein said specification file is associated with a computer aided design system.

25. The laser drilling system of claim 18 wherein said computer system is configured to receive at least a portion of said first, second and third parameters by manual input through a user interface associated with said computer system.

26. A computer implemented method of operating a laser drilling system, comprising:

receiving a plurality of input parameters associated with a desired laser drilling operation, including laser beam parameters, workpiece material parameters selected from displayed known workpiece materials and inputted required material characteristics, and workpiece geometry parameters sufficient to define size and shape of a tapered hole to be drilled in a workpiece;

assessing said plurality of input parameters to determine whether the input parameters are incompatible with said desired laser drilling operation;

generating a set of laser drilling system control instructions to said laser drilling system and exporting said generated set to said laser drilling system unless said assessing step determined that said input parameters are incompatible, wherein said instructions define a tool path that is used to direct position of a laser beam produced according to the laser beam parameters upon a workpiece of material indicated by the workpiece material parameters to produce the tapered hole by varying position of the laser beam to remove layers of workpiece material and by removing workpiece material layer by layer.

27. The method of claim 26 wherein said assessing step is performed by extracting compatibility data from a database.

28. The method of claim 26 further comprising inspecting a workpiece processed by said laser drilling system and creating and storing a new laser drilling data set in a database as compatibility data.

29. The method of claim 26 further comprising executing a tool path algorithm based on said input parameters.

30. A laser drilling system comprising:

an input receptive of input laser drilling parameters including laser parameters, workpiece material parameters selected from displayed known workpiece materials and inputted required material characteristics, and workpiece geometry parameters sufficient to define size and shape of a tapered hole to be drilled in a workpiece;

a database having a plurality of known laser drilling parameter combinations stored in memory operable with a data processing system; and a computer system accessing said database, making a comparison between the received laser drilling parameters and a known laser drilling parameter combination, and determining whether the received laser drilling parameters are incompatible based on the comparison, wherein incompatibility indicates an inability to use a tool path to direct position of a laser beam produced according to the laser parameters upon a workpiece of material indicated by the workpiece material parameters to produce the tapered hole by varying position of the laser beam to remove layers of workpiece material and by removing workpiece material layer by layer.

31. The system of claim 30 wherein said computer system is configured to log data corresponding the quality of laser drilling operations performed by said laser drilling system and to use said logged data in assessing whether said received laser drilling parameters are incompatible.

32. The system of claim 30 wherein said workpiece material parameters include a plurality of selectable workpiece materials suitable for forming an inkjet nozzle plate, wherein said workpiece geometry parameters include a plurality of selectable nozzle-shaped holes suitable for forming an inkjet nozzle in said nozzle plate, and wherein said laser parameters include a plurality of selectable lasers and optical sets suitable for drilling said inkjet nozzle in said nozzle plate.

33. An inkjet nozzle manufactured by the system of claim 32.

34. An inkjet head having the ink-jet nozzle of claim 33.

35. An inkjet printer having the inkjet head of claim 34.

* * * * *